United States Patent
Kawakami et al.

(10) Patent No.: US 11,578,000 B2
(45) Date of Patent: Feb. 14, 2023

(54) ALUMINA MATERIAL

(71) Applicant: SUMITOMO CHEMICAL COMPANY, LIMITED, Tokyo (JP)

(72) Inventors: Yoshitaka Kawakami, Niihama (JP); Hiroyuki Ando, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 196 days.

(21) Appl. No.: 16/757,022

(22) PCT Filed: Oct. 23, 2018

(86) PCT No.: PCT/JP2018/039393
§ 371 (c)(1),
(2) Date: Apr. 17, 2020

(87) PCT Pub. No.: WO2019/082905
PCT Pub. Date: May 2, 2019

(65) Prior Publication Data
US 2020/0339478 A1   Oct. 29, 2020

(30) Foreign Application Priority Data

Oct. 24, 2017 (JP) .............................. JP2017-205123

(51) Int. Cl.
*C04B 35/10* (2006.01)
*C04B 35/64* (2006.01)

(52) U.S. Cl.
CPC .............. *C04B 35/10* (2013.01); *C04B 35/64* (2013.01); *C04B 2235/322* (2013.01); *C04B 2235/3227* (2013.01); *C04B 2235/3244* (2013.01); *C04B 2235/6567* (2013.01)

(58) Field of Classification Search
None
See application file for complete search history.

(56) References Cited

U.S. PATENT DOCUMENTS

2005/0234137 A1  10/2005  Espinoza et al.
2011/0053763 A1   3/2011  Verdier et al.

FOREIGN PATENT DOCUMENTS

| CN | 1799689 | 7/2006 |
|---|---|---|
| CN | 1850326 | 10/2006 |
| CN | 103599768 | 2/2014 |
| EP | 0 771 584 A1 | 5/1997 |
| JP | S62-176542 | 8/1987 |
| JP | S63-242917 | 10/1988 |
| JP | 2005-193179 | 7/2005 |
| WO | WO-2009/112356 | 9/2009 |

OTHER PUBLICATIONS

European Extended Search Report, dated Jul. 7, 2021, issued in corresponding European Patent Application No. 18871400.0, (9 pages).
Office Action issued in corresponding Chinese Patent Application No. 201880068012.4 dated Feb. 28, 2022.
A.C. Faro et al., "Mixed-oxide formation during preparation of alumina-supported zirconia: an EXAFS and DFT study", Physical Chemistry Chemical Physics, 2003, vol. 5, p. 3811-3817.
C.M. Wang et al., "Atomic Structural Environment of Grain Boundary Segregated Y and Zr in Creep Resistant Alumina From EXAFS", Acta Materialia, 1999, vol. 47, No. 12, p. 3411-3422.
Dalmaschio, Cleocir Jose et al., "Oxide surface modification: Synthesis and characterization of zirconia-coated alumina", Journal of Colloid and Interface Science, 2010, vol. 343, p. 256-262.
International Report on Patentability and Written Opinion dated Feb. 19, 2019 for corresponding International Patent Application No. PCT/JP2018/039393.
International Search Report dated Feb. 19, 2019 for corresponding International Patent Application No. PCT/JP2018/039393.
Kou, Yuan et al., "Investigation of the Ensemble Effect of ZrO2/Al2O3 Catalyst on Selective Synthesis of Ethylene from CO and H2", Journal of Catalysis, 1996, vol. 162, p. 361-364.
M.K. Loudjani et al., "Study of the Chemical State and Local Structure of Zirconium in Polycrystalline alpha-Alumina by X-Ray Absorption Spectroscopy and STEM Analysis of Thin Foils", Journal de Physique IV, 1997, vol. 7, Collogue C2, p. C2-1209 to C2-1210.
M.K. Loudjani et al., "Study of the local environment around zirconium ions in polycrystalline alpha-alumina in relation with kinetics of grain growth and solute drag", Journal of the European Ceramic Society, 2000, vol. 20, p. 1483-1491.
P. Berthet et al., "Study by EXAFS of zirconium environment in Al2O3—ZrO2 material prepared from metal-alkoxides", Journal de Physique, 1986, vol. 2, Collogue C8, p. C8-729 to C8-732.
Wang, Xiuyun et al., "Rare-Earth-Doped Pt/Ba/Ce0.6Zr0.4O2-Al2O3 for NOx Storage and Reduction: The Effect of Rare-Earth Doping on Efficiency and Stability", ChemCatChem, 2014, vol. 6, p. 237-244.
Yamamoto, Takashi,, "X-ray Absorption Spectroscopic Characterization of Solid Acid-base Catalysts", Journal of the Japan Petroleum Institute, 2014, vol. 57, No. 6, p. 261-270.
Yang, Xiaobo et al., "n-Butane isomerization catalyzed by sulfated zirconia nanocrystals supported on silica or gamma-alumina", Catalysis Letters, 2006, vol. 106, Nos. 3-4, p. 195-203.

(Continued)

*Primary Examiner* — Sarah A. Slifka
(74) *Attorney, Agent, or Firm* — Foley & Lardner LLP

(57) ABSTRACT

Provided is alumina material comprising alumina and zirconium, wherein in a radial distribution function obtained by Fourier-transforming an extended X-ray absorption fine structure (EXAFS) spectrum of a K absorption edge of the zirconium in the alumina material, the value of $I_B/I_A$ is 0.5 or less where $I_A$ is a maximum intensity among the intensities of peaks present at 0.1 nm to 0.2 nm, and $I_B$ is a maximum intensity among the intensities of peaks present at 0.28 nm to 0.35 nm.

9 Claims, 7 Drawing Sheets

(56) References Cited

OTHER PUBLICATIONS

Yang, Xiuchun et al., "Atomic-Scale Structure of Al2O3—ZrO2 Mixed Oxides Prepared by Laser Ablation", AIP Conference Proceedings, 2007, vol. 882, p. 563-565.
Office Action issued in corresponding Japanese Patent Application No. 020-513952 dated Aug. 23, 2022.
Korean Office Action issued in connection with KR Appl. Ser. No. 10-2020-7014055 dated Dec. 1, 2022 (9 pages).

[Fig. 1]
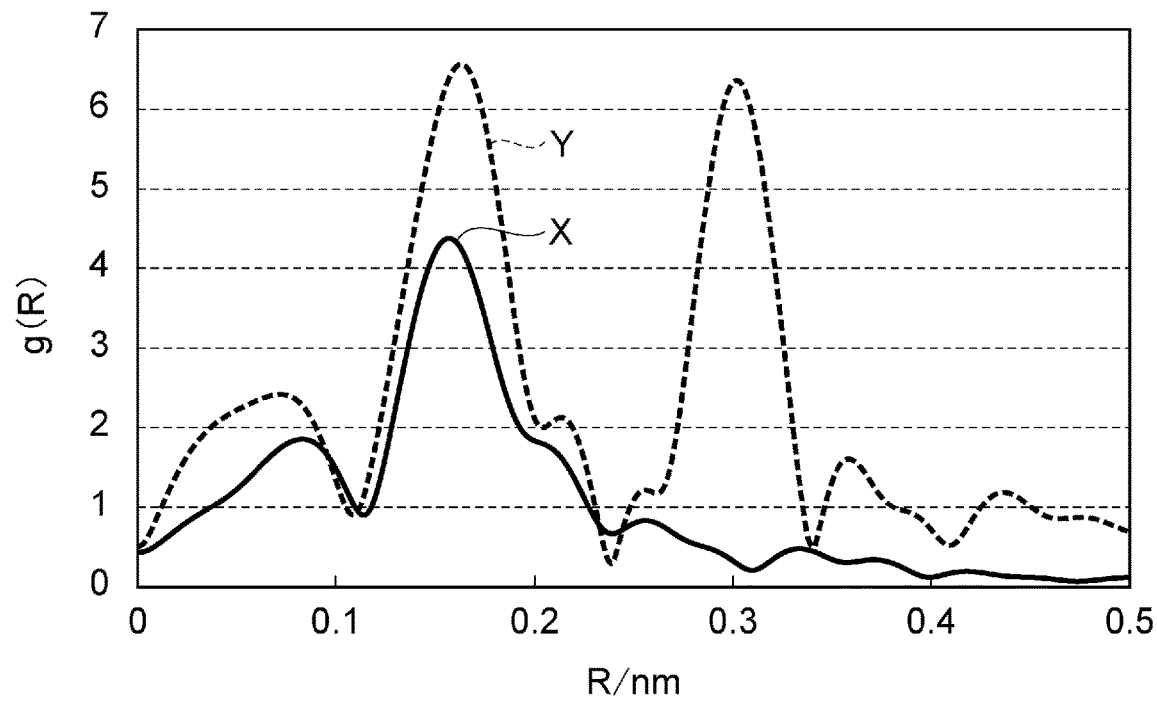

[Fig. 2]
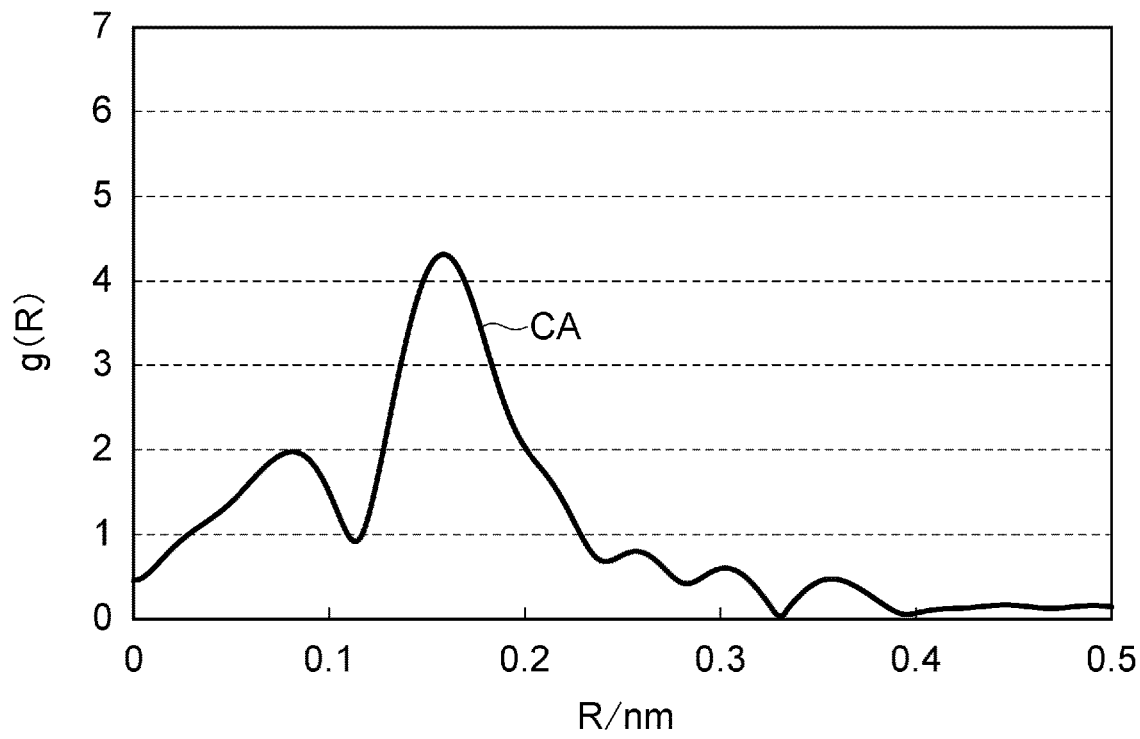

[Fig. 3]
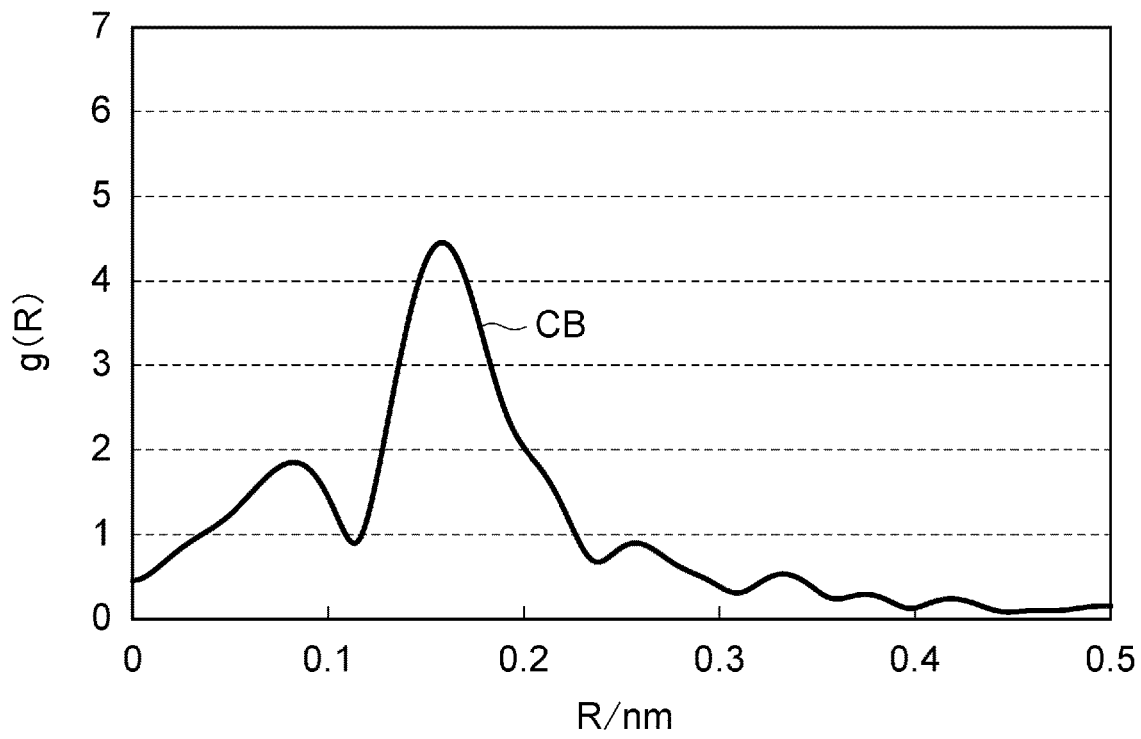

[Fig. 4]
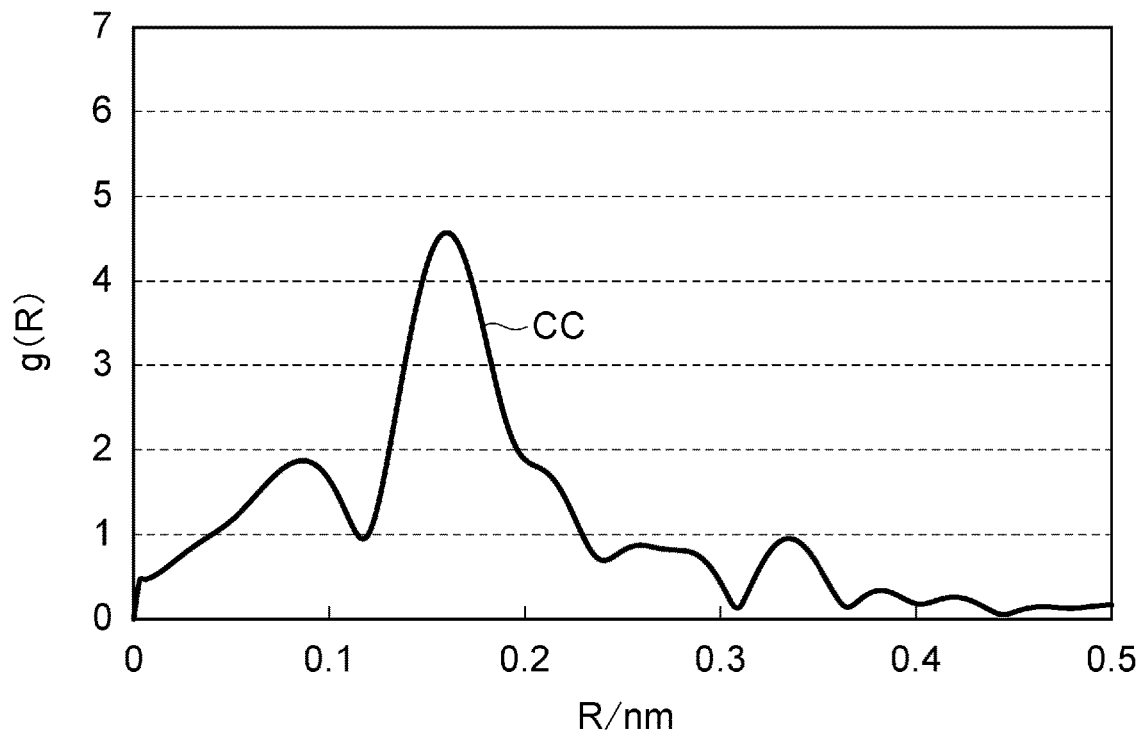

[Fig. 5]
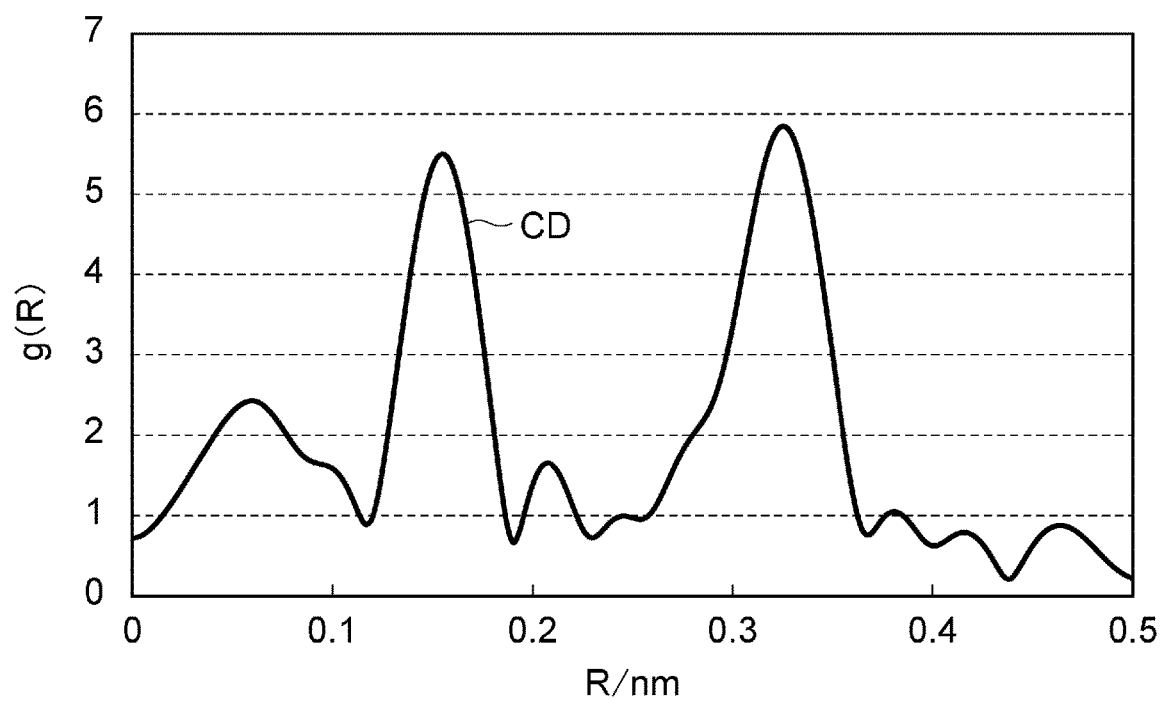

[Fig. 6]
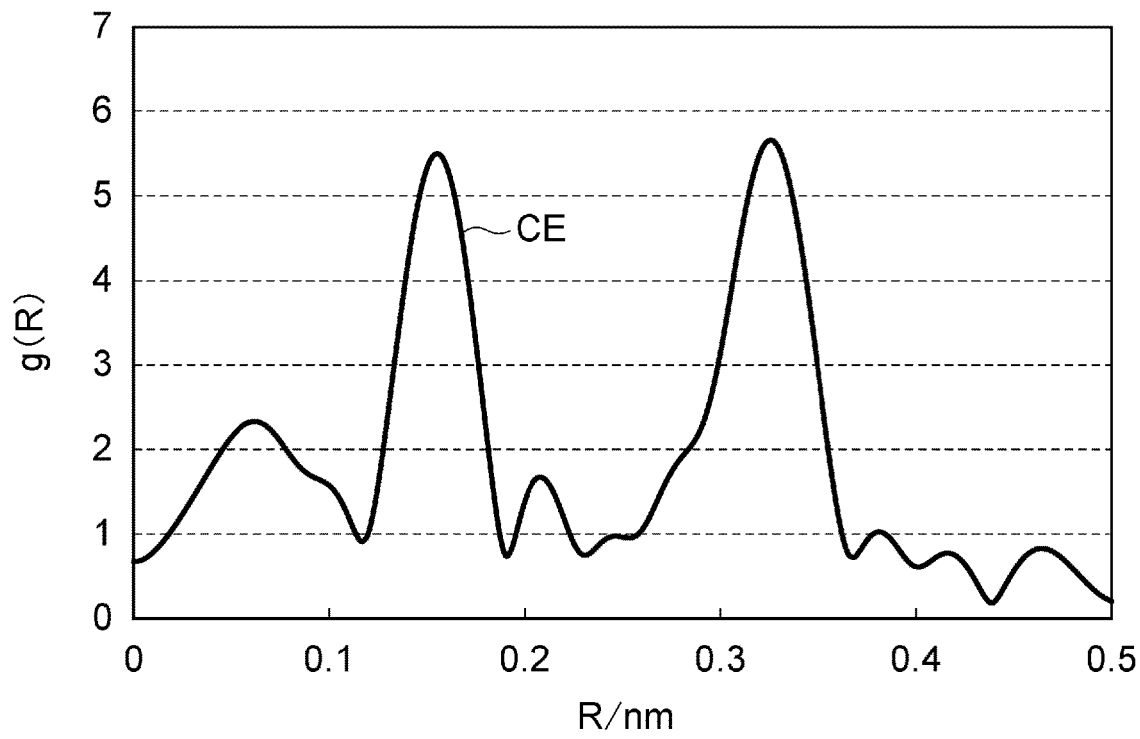

[Fig. 7]
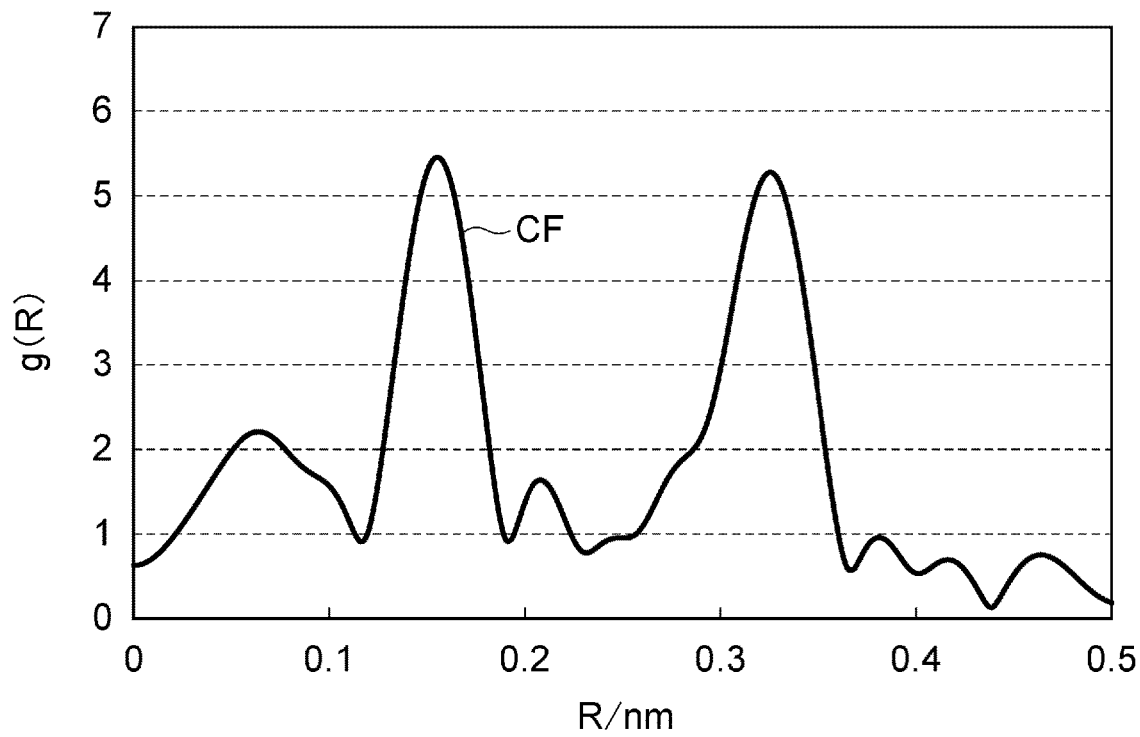

ALUMINA MATERIAL

CROSS-REFERENCE TO RELATED APPLICATIONS

The present application claims priority under 37 U.S.C. § 371 to International Patent Application No. PCT/JP2018/039393, filed Oct. 23, 2018, which claims priority to and the benefit of Japanese Patent Application No. 2017-205123, filed on Oct. 24, 2017. The contents of these applications are hereby incorporated by reference in their entireties.

TECHNICAL FIELD

The present invention relates to an alumina material, and particularly to an alumina material having high heat resistance.

BACKGROUND ART

Alumina is excellent in heat resistance, insulation properties, abrasion resistance, corrosion resistance and so on, and is therefore widely used for various applications. Examples of specific applications of alumina include treatment of exhaust gas from internal combustion engines of automobiles, two-wheeled vehicles and the like, and treatment of exhaust gas at a high temperature in gas turbines, boilers and the like, and alumina is widely used as a catalyst support or a noble metal support material. A noble metal supported on the surface of alumina imparts high catalytic activity.

When used for such applications, alumina is exposed to a high temperature of 900° C. to 1000° C., or higher than 1200° C., and therefore may cause reduction of the specific surface area due to sintering. In this case, a noble metal supported on the surface of alumina may be aggregated, or involved in sintering to be caught in the alumina, resulting in deterioration of catalytic activity. Thus, alumina is required to have high heat resistance, and to have a small reduction in specific surface area even when used under a high-temperature condition.

As a study for imparting heat resistance to alumina, for example, Japanese Unexamined Patent Publication No. S62-176542 (Patent Literature 1) describes a method in which from a liquid mixture of an aqueous solution in which powder of alumina or alumina hydrate with a particle size of 500 microns or less is dispersed, and a solution containing a rare earth substance, the rare earth substance is deposited on the alumina or the alumina hydrate.

Japanese Unexamined Patent Publication No. S63-242917 (Patent Literature 2) describes a method in which a mixed solution of an aluminum alkoxide and a lanthanum alkoxide is hydrolyzed to obtain a sol, the sol is then turned into a gel, and the gel is fired.

Japanese Unexamined Patent Publication No. 2005-193179 (Patent Literature 3) discloses secondary particles including primary particles consisting of $Al_2O_3$, primary particles consisting of one or two or more metal oxides among $ZrO_2$, $SiO_2$ and $TiO_2$, and a rare earth element and/or a rare earth oxide, wherein the primary particles consisting of $Al_2O_3$ and the primary particles consisting of the metal oxides are dispersed with the former primary particles interposed between the latter primary particles and the latter primary particles interposed between the former primary particles. The average particle size of the metal oxides is stated as being several nanometers in the description, and as being 30 nm in Examples.

In addition, WO 2009/112356 (Patent Literature 4) discloses particles including zirconium oxide as a supported oxide on a support having alumina or aluminum oxyhydroxide as a base, with the supported oxide attached to the support after firing the particles at 900° C. for 4 hours. The zirconium oxide has a maximum particle size of 10 nm, and is stated as having a particle size of 4 nm as measured by quasielastic light scattering in Examples.

CITATION LIST

Patent Literature

PTL 1: Japanese Unexamined Patent Publication No. S62-176542
PTL 2: Japanese Unexamined Patent Publication No. S63-242917
PTL 3: Japanese Unexamined Patent Publication No. 2005-193179
PTL 4: WO 2009/112356

SUMMARY OF INVENTION

Technical Problem

However, when the alumina material containing rare earth element obtained by the methods described in Patent Literatures 1 and 2 is exposed to heat treatment at a high temperature, e.g., heating treatment at 1200° C. for 4 hours, it is difficult to maintain a BET specific surface area of 50 $m^2/g$ or more, leading to deterioration of catalytic activity.

The techniques disclosed in Patent Literatures 3 and 4 are techniques for improving the heat resistance of alumina material by coexistence of alumina particles and zirconium oxide particles, but when the alumina material is subjected to heating treatment at 1200° C. for 4 hours, it is difficult to maintain a BET specific surface area of 50 $m^2/g$ or more, and the alumina material still has insufficient heat resistance.

The present invention has been made in view of the above-described circumstances, and a main object of the present invention is to provide an alumina material excellent in heat resistance, the alumina material having a small reduction in BET specific surface area through heat treatment.

Solution to Problem

For solving the above-described problems, the present invention provides the following alumina material.

[1] Alumina material comprising alumina and zirconium, wherein in a radial distribution function obtained by Fourier-transforming an extended X-ray absorption fine structure (EXAFS) spectrum of a K absorption edge of the zirconium in the alumina material, a value of $I_B/I_A$ is 0.5 or less where $I_A$ is a maximum intensity among intensities of peaks present at 0.1 nm to 0.2 nm, and $I_B$ is a maximum intensity among intensities of peaks present at 0.28 nm to 0.35 nm.

[2] The alumina material according to [1], wherein a clear peak is not observed at 0.28 nm to 0.35 nm in the radial distribution function.

[3] The alumina material according to [1] or [2], wherein an amount of zirconium in the alumina material is 0.1% by weight to 15% by weight based on a total weight of the alumina material.

[4] The alumina material according to anyone of [1] to [3], wherein the alumina material further comprises at least one of rare earth elements.

[5] The alumina material according to [4], wherein the at least one of rare earth elements is selected from the group consisting of cerium, yttrium, lanthanum, praseodymium, neodymium, and ytterbium.

[6] The alumina material according to [4], wherein the at least one of rare earth elements is cerium and/or lanthanum.

[7] The alumina material according to [4], wherein the at least one of rare earth elements is lanthanum.

[8] The alumina material according to anyone of [4] to [7], wherein a total amount of zirconium and the at least one of rare earth elements in the alumina material is 0.5% by weight to 15% by weight based on a total weight of the alumina material.

[9] The alumina material according to any one of [1] to [8], wherein a specific surface area after the alumina material is subjected to heat treatment under an air atmosphere at 1200° C. for 4 hours is 50 m²/g or more.

[10] The alumina material according to anyone of [1] to [9], wherein the alumina comprises at least 80 wt % of γ alumina.

Advantageous Effects of Invention

According to the present invention, there is provided alumina material excellent in heat resistance, the alumina material having a small reduction in BET specific surface area through heat treatment.

BRIEF DESCRIPTION OF DRAWINGS

FIG. 1 is a graph showing a radial distribution function g(R) obtained by Fourier-transforming an extended X-ray absorption fine structure (EXAFS) spectrum of a K absorption edge of zirconium in the alumina material of Working Example 2. A curve X is the radial distribution g(R) in Working Example 2, and as a reference, a similar radial distribution function g(R) for only zirconia ($ZrO_2$) is shown as a curve Y.

FIG. 2 is a graph showing a radial distribution function g(R) for Working Example 1 as a curve CA.

FIG. 3 is a graph showing a radial distribution function g(R) for Working Example 3 as a curve CB.

FIG. 4 is a graph showing a radial distribution function g(R) for Working Example 4 as a curve CC.

FIG. 5 is a graph showing a radial distribution function g(R) for Comparative Example 1 as a curve CD.

FIG. 6 is a graph showing a radial distribution function g(R) for Comparative Example 2 as a curve CE.

FIG. 7 is a graph showing a radial distribution function g(R) for Comparative Example 3 as a curve CF.

DESCRIPTION OF EMBODIMENTS

Alumina materials according to the present invention will be described in detail below.

The alumina material according to the present invention is alumina material comprising alumina and zirconium, wherein in a radial distribution function obtained by Fourier-transforming an extended X-ray absorption fine structure (EXAFS) spectrum of a K absorption edge of the zirconium (Zr) in the alumina material, the value of $I_B/I_A$ is 0.5 or less where $I_A$ is a maximum intensity among the intensities of peaks present at 0.1 nm to 0.2 nm, and $I_B$ is a maximum intensity among the intensities of peaks present at 0.28 nm to 0.35 nm. $I_B/I_A$ may be 0.2 or less.

In the present invention, the alumina means anyone of α-alumina, γ-alumina, η-alumina, θ-alumina, δ-alumina, boehmite and pseudo-boehmite, and may be one thereof, or a mixture of two or more thereof. It is preferable that the alumina contains γ-alumina from the viewpoint of obtaining better heat resistance, and the ratio of γ-alumina in the alumina is preferably 80% by weight or more, more preferably 90% by weight or more, most preferably 95% by weight or more.

The alumina material according to the present invention may further contains a rare earth element in addition to zirconium if necessary. Specific examples of the rare earth element include cerium (Ce), yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu). Among these elements, Ce, Y, La, Pr, Nd and Yb are preferable, Ce and La are more preferable, and La is especially preferable from the viewpoint of heat resistance. These rare earth elements may be used singly or in combinations of two or more thereof. The rare earth elements in the alumina material may be oxide. The zirconium in the alumina material may be oxide.

The alumina material according to the present invention consists essentially of alumina in addition to zirconium, rare earth element(s) if necessary, and oxygen bonded to zirconium and rare earth element(s), but may contain unavoidable impurities brought in depending on the state of feedstocks, materials, production equipment or the like, e.g. Fe, Si and/or Na. It is preferable that Fe, Si and Na are not contained at all in the alumina material because they are known to reduce catalytic performance, but it is generally difficult to ensure that the content of these elements is 0. Such unavoidable impurities may be contained in an amount that does not markedly degrade the heat resistance of the alumina material, and the generally acceptable total amount thereof is 100 ppm or less. The content of Fe, Si and Na is preferably 10 ppm or less in total from the viewpoint of improving catalytic performance. The content of Fe, Si, Na and the like can be measured by emission spectroscopy.

The amount of zirconium in the alumina material according to the present invention is preferably 0.1% by weight to 15% by weight, more preferably 0.2% by weight to 10% by weight, especially preferably 0.5% by weight to 5% by weight based on the total weight of the alumina material from the viewpoint of improving the heat resistance of the alumina material. When the amount of zirconium is excessively small, the heat resistance is not sufficient, and even when the amount of zirconium is excessively large, enhancement of the effect of added zirconium is small. The total amount of the rare earth element(s) contained in the alumina material is normally 0% by weight to 10% by weight, preferably 0% by weight to 5% by weight, more preferably 0% by weight to 3% by weight based on the total weight of the alumina material. The total amount of zirconium and all the rare earth elements is preferably 0.5% by weight to 15% by weight, more preferably 1% by weight to 10% by weight, especially preferably 2% by weight to 8% by weight based on the total weight of the alumina material.

The EXAFS spectrum in the present invention will now be described. The EXAFS spectrum in the present invention is treated similarly to a general EXAFS spectrum, and the measurement and principle of the spectrum are described in, for example, "X-Ray Absorption Spectroscopy-XAFS and Its Applications-" (edited by Toshiaki Ota (2002)). Specifically, when a monochromatic X-ray is transmitted through a substance, an X-ray absorbance of the substance is obtained from the intensity of an X-ray applied to the substance (incident X-ray intensity: $I_0$) and the intensity of an X-ray transmitted through the substance (transmitted X-ray intensity: $I_t$), and when an X-ray absorption spectrum (x axis-y axis) is measured by changing the energy of the monochromatic X-ray applied to the substance, i.e. the energy of the incident X-ray (eV, x axis) while monitoring the X-ray absorbance (y axis), there is a point at which the X-ray absorbance sharply increases, and the value on the x axis at this point is referred to as an absorption edge. The absorption edge is specific to an element constituting the substance. In addition, in the X-ray absorption spectrum, the fine oscillatory structure appearing in a region on a side with an energy higher by about 20 to 1000 eV than that of the absorption edge is referred to as an extended X-ray absorption fine structure (EXAFS), and the spectrum thereof is referred to as an EXAFS spectrum.

When the EXAFS spectrum is Fourier-transformed, a radial distribution function g(R) centering on an X-ray absorption atom (atom to be given attention) is obtained. With the radial distribution function, information such as a distance between an X-ray absorption atom and an X-ray scattering atom (atom in the vicinity of X-ray absorption atom) and the number of X-ray scattering atoms can be obtained, and information of the vicinity of the atom to be given attention can be obtained. In the present invention, attention is given to the K absorption edge of zirconium (Zr).

The alumina material in the present invention is alumina material comprising alumina and zirconium, wherein in a radial distribution function obtained by Fourier-transforming the extended X-ray absorption fine structure (EXAFS) spectrum of the K absorption edge of zirconium in the alumina material, the value of $I_B/I_A$ is 0.5 or less, preferably 0.2 or less, where $I_A$ is a maximum intensity among the intensities of peaks present at 0.1 nm to 0.2 nm (hereinafter, referred to as "peaks A"), and $I_B$ is a maximum intensity among the intensities of peaks present at 0.28 nm to 0.35 nm (hereinafter, referred to as "peaks B"). The alumina material has a small reduction in specific surface area even when exposed to a high temperature, e.g. 1200° C. for 4 hours, and has high heat resistance. The value of $I_B/I_A$ is more preferably 0.15 or less, further more preferably 0.12 or less, and when the value of $I_B/I_A$ is in such a range, the heat resistance is further improved. Since normally the value of $I_B$ is not 0, the value of $I_B/I_A$ normally exceeds 0.

A radial distribution function of zirconium for zirconia ($ZrO_2$; zirconium oxide) particles may be obtained in a similar manner stated above. In this radial distribution function of zirconium for zirconia particles, a peak from an O atom (oxygen atom) appears at a position where the interatomic distance from the Zr atom is 0.1 nm to 0.2 nm. That is, the peak A in the present invention is supposed to originate from the O atom bonded to the Zr atom in the alumina material of the present invention. In addition, in the radial distribution function of zirconium for zirconia particles, a peak from another Zr atom appears at a position where the interatomic distance from the Zr atom is 0.28 nm to 0.35 nm. That is, the peak B in the present invention originates from another Zr atom adjacent to the Zr atom contained in the zirconia particles. The positions of these peaks correspond to interatomic distances, but these interatomic distances may be different from actual values due to the influence of a phase shift. However, in the present invention, the position of the peak is treated as an interatomic distance. When in each range, there is not a so called peak, and only a gentle curve (including a straight line) is present, the value of a maximum intensity in the curve is defined as $I_B$ or $I_A$.

The value of $I_B/I_A$ being 0.5 or less means that the number of Zr—O—Zr structures is significantly lower than the number of Zr—O structures. Oxide of zirconium exists, however it is thought that there are few zirconia particles (primary particles of zirconia) in which a plurality of zirconium atoms are bonded via oxygen atoms. In other words, it is estimated that many of zirconium atoms are isolated from other zirconium atoms and dispersed in the alumina material.

In the alumina material according to the present invention, it is preferable that a clear peak is not observed in the range of the peak B: 0.28 nm to 0.35 nm. When a peak is not present in the range of 0.28 nm to 0.35 nm, it is presumed that primary particles of zirconia (zirconium oxide) are not present. It is known that zirconia hardly forms a solid solution with alumina. Based on the fact that the alumina material has no primary particles of zirconia, it is presumed that zirconium atoms are not aggregated to form zirconia, but zirconium atoms are present in a highly dispersed manner in the alumina material. Here, the "clear peak" means an upwardly projected peak, where the ratio of the intensity of the peak to $I_A$ is 0.12 or less, and the half width is 0.06 nm or less.

In the alumina material of the present invention, zirconium may be present as zirconia as long as the above-described requirement for $I_B/I_A$ is met. Such zirconia can be present in the alumina material of the present invention as a result of, for example, addition of a large amount of zirconium when zirconium is added in production of the alumina material of the present invention, or mixing of zirconia as impurity from feedstocks. The amount of zirconium present as zirconia is preferably 10% by weight or less, especially preferably 5% by weight or less based on the total amount of zirconium.

In the alumina material according to the present invention, it is preferable that the BET specific surface area be 80 $m^2/g$ to 500 $m^2/g$. When the BET specific surface area is controlled to fall within such a range, catalytic performance can be favorably imparted. From the viewpoint of favorably imparting catalytic performance, the BET specific surface area is more preferably 85 $m^2/g$ or more, and more preferably 300 $m^2/g$ or less. The BET specific surface area can be determined by a $N_2$ adsorption method in accordance with a method set forth in JIS-Z-8830.

In the alumina material according to the present invention, the untapped density is preferably 0.1 g/ml to 1.1 g/ml. When the untapped density is controlled to fall within such a range, handling properties in a slurry preparation step are improved. From the viewpoint of improving handling properties in the slurry preparation step, the untapped density is more preferably 0.3 g/ml or more, and more preferably 0.8 g/ml or less. The untapped density is determined in accordance with a method described in JIS R 9301-2-3. That is, a sample (alumina material powder) is allowed to fall freely into a container (cylinder) having a known volume, the container being prevented from vibrating and left standing, the sample is collected, the mass of the collected sample is determined, and the determined mass is divided by the volume of the sample to calculate the density.

The alumina material according to the present invention having such a configuration has a small reduction in specific surface area even when exposed to a high temperature over a long period of time, and is excellent in heat resistance. The alumina material according to the present invention having such properties may be favorably used mainly for a support of the noble metal in an automotive catalyst, and automotive catalysts excellent in heat resistance can be provided.

The alumina material according to the present invention can be produced by a method comprising: (1) step S1 of obtaining an aluminum alkoxide; (2) step S2 of obtaining aluminum hydroxide by hydrolyzing the aluminum alkoxide; (3) step S3 of obtaining aluminum hydroxide powder by drying the aluminum hydroxide; and (4) step S4 of obtaining alumina material by firing the aluminum hydroxide powder, wherein in step S2, zirconium, and a rare earth element if necessary are added. Hereinafter, the method will be described in more detail.

S1: Step of obtaining Aluminum Alkoxide

In step S1 of obtaining an aluminum alkoxide, an aluminum alkoxide ($Al(OR)_3$) is obtained by a solid-liquid reaction of metallic aluminum (Al) and an alcohol (ROH) as represented by the following formula (1).

$$2Al+6ROH \rightarrow 2Al(OR)_3+3H_2 \quad (1)$$

Here, each R is independently at least one selected from the group consisting of methyl, ethyl, normal propyl, isopropyl, normal butyl, isobutyl, neobutyl, normal pentyl, isopentyl, neopentyl, normal hexyl, isohexyl, neohexyl, normal heptyl, isoheptyl, neoheptyl, normal octyl, isooctyl and neooctyl. In particular, each R is preferably at least one selected from the group consisting of methyl, ethyl, normal propyl and isopropyl.

The metallic aluminum as a feedstock is not particularly limited, and it is preferable to use high-purity aluminum in which the content of impurities such as iron, silicon, sodium, copper and magnesium contained is 100 ppm or less, and whose purity is 99.99% or more. By using such high-purity metallic aluminum, high-purity alumina material whose impurity content is low can be more effectively produced. In addition, purification of the aluminum alkoxide obtained by using the metallic aluminum becomes unnecessary, so that production efficiency is improved. As such high-purity aluminum, commercially available product may be used.

The form of the metallic aluminum is not particularly limited, and may be any of an ingot form, a pellet form, a foil form, a line form, a powder form and so on.

As the alcohol as a feedstock, a monohydric alcohol having preferably 1 to 8 carbon atoms, more preferably 1 to 4 carbon atoms is used. For alcohol, the longer the carbon chain generally becomes, the lower the reactivity with metallic aluminum becomes. More specifically, examples of the alcohol as a feedstock include methyl alcohol, ethyl alcohol, n-propyl alcohol, isopropyl alcohol, n-butyl alcohol, sec-butyl alcohol and tert-butyl alcohol.

The temperature at which the metallic aluminum is reacted with the alcohol is not particularly limited as long as it is a temperature allowing the reaction to proceed, but from the viewpoint of accelerating the reaction of the metallic aluminum and the alcohol, it is preferable to carry out the reaction under a reflux condition at a boiling temperature of a solvent system used.

Through step S1, an aluminum alkoxide having an alkoxy group corresponding to the used alcohol as described above is generated. More specifically, as the aluminum alkoxide, aluminum ethoxide, aluminum n-propoxide, aluminum isopropoxide, aluminum n-butoxide, aluminum sec-butoxide, aluminum t-butoxide or the like is generated.

S2: Step S2 of obtaining Aluminum Hydroxide by Hydrolyzing Aluminum Alkoxide

In step S2, aluminum hydroxide is obtained by hydrolyzing the aluminum alkoxide generated in step S1.

The hydrolysis in step 2 may be performed in one stage, or performed in two or more stages.

When the hydrolysis is performed in two stages, for example, it is performed in the following manner.

First, as a first hydrolysis treatment, a hydrolysis treatment of a part of the aluminum alkoxide is caused to proceed by adding an alcohol solution containing water in a predetermined concentration to a mixture of aluminum alkoxide and solvent such as alcohol, to cause a gentle hydrolysis reaction to occur without causing a local reaction by rapid heat generation (first hydrolysis step S21). Next, as a second hydrolysis treatment, hydrolysis treatment of the whole amount of the aluminum alkoxide is caused to proceed by adding water (second hydrolysis step S22).

In step S2, a zirconium source such as zirconium compounds, and a rare earth element source such as rare earth element compounds if necessary are added to the alcohol solution containing water and/or the mixture of aluminum alkoxide and solvent such as alcohol. The zirconium source and the rare earth element source if necessary may be dissolved or dispersed in liquid. Aluminum hydroxide containing zirconium and a rare earth element if necessary is obtained by hydrolysis of aluminum alkoxide in the presence of the zirconium source, and the rare earth element source if necessary The zirconium and rare earth element sources to be added can be used in the form of a zirconium compound and a rare earth element compound such as a hydroxide, a chloride, a carbonate, a nitrate, an acetate or an oxalate.

The zirconium compound and rare earth element compound may be dissolved in a solvent, and added as a solution. In addition, when the zirconium compound and rare earth element compound are hardly dissolved in the solvent, the zirconium compound and rare earth element compound may be added as a dispersion obtained by dispersing fine particles of these compounds in the solvent. A part of the zirconium compound and rare earth element compound if necessary may be dissolved in the solvent of the dispersion.

The solvents may be used singly, or in mixture of two or more thereof, and may be appropriately selected in consideration of the solubility or dispersibility of the zirconium compound and rare earth element compound in the solvent, the concentration of the solution, and other production conditions etc.

In a case that a zirconium compound and a rare earth element compound if necessary are added to the alcohol solution containing water, from the viewpoint of ensuring that the zirconium and rare earth element if necessary are more uniformly contained in aluminum hydroxide, it is preferable to use a solution obtained by dissolving the zirconium compound and rare earth element compound if necessary in a mixture of water and an alcohol. The solution may contain organic solvent(s) other than alcohols. When the zirconium and rare earth element if necessary are more uniformly contained in aluminum hydroxide, alumina material in which the zirconium and rare earth element if necessary are highly dispersed in alumina material can be produced. Such alumina material can provide a small reduction in BET specific surface area after heat treatment at a high temperature, and is better in heat resistance.

In the first hydrolysis step S21, not mere water but an alcohol solution containing water in a predetermined concentration is used. The concentration of water in the alcohol solution to be added is preferably 5% by weight to 30% by weight, more preferably 5% by weight to 20% by weight, still more preferably 5% by weight to 10% by weight. When the concentration of water in the alcohol solution is 5% by weight or more, hydrolysis sufficiently proceeds, and on the other hand, when the concentration of water in the alcohol solution is 30% by weight or less, a local hydrolysis reaction can be suppressed to prevent aggregation of aluminum hydroxide.

In addition, in the first hydrolysis step S21, hydrolysis may be performed by adding an alcohol solution containing water, for example, in the above-described concentration such that the molar ratio of water to the aluminum alkoxide is, for example, 1.5 to 2.0. When the molar ratio of water in the alcohol solution to the aluminum alkoxide is 1.5 or more, suppression of hydrolysis of the aluminum alkoxide can be prevented. On the other hand, when the molar ratio is 2.0 or less, a local hydrolysis reaction of the aluminum alkoxide can be prevented.

The alcohol solution containing water is not particularly limited, and an alcohol solution in which water is added to the alcohol used in the above-mentioned step S1 can be used. In this case, the alcohol used for hydrolysis can be recovered to reuse the recovered alcohol for step S1.

The reaction temperature in hydrolysis of the aluminum alkoxide by using the alcohol solution containing water is not particularly limited, and may be, for example, a temperature ranging from ordinary temperature to the boiling point of the solvent (inclusive). In the step 521, the zirconium compound, and the rare earth compound if necessary can be added to the aluminum alkoxide. In this case, it is preferable to carry out a hydrolysis reaction under a condition in which the solvent is refluxed because the zirconium and rare earth element can be more uniformly dispersed.

It is preferable to obtain a mixture of a solid and a slight amount of an alcohol by removing most of the alcohol after the reaction in step S21.

Next, in the second hydrolysis step S22, hydrolysis treatment of the whole amount of the aluminum alkoxide is performed by adding water to the mixture after first hydrolysis step S21.

In the second hydrolysis step S22, hydrolysis may be performed by adding water such that the molar ratio of water to the aluminum alkoxide is preferably 1.0 to 7.0, more preferably 1.5 to 3.0. When the molar ratio of water to the aluminum alkoxide is 1.0 or more, hydrolysis of the whole amount of the aluminum alkoxide can be performed. On the other hand, when the molar ratio is 7.0 or less, it is possible to prevent the amount of water contained in aluminum hydroxide generated from being excessively large. This prevents reduction of productivity due to an increase in time required for drying in drying treatment of aluminum hydroxide.

Also in the hydrolysis treatment in the second hydrolysis step S22, the reaction temperature is not particularly limited, and may be, for example, a temperature ranging from ordinary temperature to the boiling point of the solvent (inclusive).

S3: Step of obtaining Aluminum Hydroxide Powder by Drying Aluminum Hydroxide

In step S3, aluminum hydroxide powder is obtained by drying the aluminum hydroxide obtained in step S2. The aluminum hydroxide powder is not required to be fully dried, and since drying can also be performed at the time of firing the aluminum hydroxide powder in subsequent step S4, the aluminum hydroxide powder may be appropriately dried to the extent that too much time is not taken in step S4.

As a drying method, for example, a method is preferable in which aluminum hydroxide is heated to evaporate water. As a drying temperature, for example, a temperature equal to or higher than the boiling point of the solvent is preferable. As a dryer, for example, a material standing-type dryer, a material transfer-type dryer, a material stirring-type dryer, a hot air transfer-type dryer, a cylindrical dryer, an infrared dryer, a freeze dryer or a high-frequency dryer can be used.

S4: Step S4 of obtaining Alumina Material by Firing Aluminum Hydroxide Powder

In step S4, alumina material containing alumina, zirconium, and a rare earth element if necessary is obtained by firing the aluminum hydroxide powder containing zirconium, and a rare earth element if necessary.

While the conditions for firing treatment in firing step S4 are not particularly limited, heat energy required for changing aluminum hydroxide powder into alumina is applied.

Alumina material can be obtained by, for example, firing aluminum hydroxide powder under the following firing treatment conditions. For example, aluminum hydroxide is held at a firing temperature of 800° C. or higher for a certain period of time to be fired. More specifically, alumina material can be obtained by, for example, holding aluminum hydroxide at a firing temperature of 900° C. to 1100° C. for 0.5 hours to 20 hours.

The temperature elevation rate in elevation of the temperature to a predetermined firing temperature is not particularly limited, and is set to, for example, 30° C./hour to 500° C./hour.

The firing treatment can be performed by using, for example, a firing furnace. As the firing furnace, a material standing-type firing furnace, e.g. a tunnel kiln, a batch airflow box-type firing furnace, a batch co-flow box-type firing furnace or the like can be used.

In addition, the firing atmosphere is not particularly limited, and may be any of an air atmosphere, an inert atmosphere of nitrogen gas, argon gas or the like, and a reducing atmosphere.

The firing container is not particularly limited, and for example, a sheath having a measuring box shape, a bottomed cylinder shape or polygonal prism shape can be used. The firing container is preferably one made of alumina ceramic. When a firing container made of alumina ceramic is used, contamination of alumina material during firing can be prevented, so that high-purity alumina material can be obtained.

While the method for producing the alumina material according to the present invention has been described above, a person skilled in the art, who has understood the desired properties of the alumina material according to the present invention, may make a trial-and-error to find a method for producing the alumina material having desired properties according to the present invention, the method being different from the above-described production method.

In use of the alumina material according to the present invention for various applications, the alumina material may be ground to control the particle size. As described above, the alumina material according to the present invention has a small reduction in heat resistance even when undergoing control of the particle size in, for example, slurry formation, and is capable of maintaining excellent heat resistance.

Examples of the grinding method include a method in which grinding is performed by using a ball mill or the like.

Method for Producing Automotive Catalyst

The alumina material according to the present invention is useful for an automotive catalyst. A method for producing an automotive catalyst comprises: (1) a step of producing a slurry containing the alumina material according to the present invention, a binder, a dispersion medium and a noble metal; (2) a step of coating a base material with the slurry; and (3) a step of sintering the alumina material in the slurry by heat-treating the base material coated with the slurry.

Examples of the binder include polyvinyl alcohol (PVA) and boehmite gel (gelled alumina hydrate). In addition, examples of the dispersion medium include water and alcohols, and it is preferable to use water. Examples of the noble metal include Pt, Pd and Rh. In addition, the slurry may contain components different than the alumina material according to the present invention, the binder, the dispersion medium and the noble metal.

As the base material, a commonly used honeycomb support may be used. Examples of the method for coating a support with a slurry include a wash coating method.

The step of sintering the alumina material may be carried out by, for example, holding the alumina material at 800° C. to 1100° C. for 0.5 hours to 10 hours.

Since the alumina material according to the present invention has excellent heat resistance, an automotive catalyst excellent in heat resistance can be provided by the method for producing an automotive catalyst according to the present invention.

EXAMPLES

Hereinafter, the present invention will be described in more detail by way of Examples, but the present invention is not limited to the Examples described below, and can be carried out with changes appropriately made within a range that can meet the above described or later-described spirit, and these changes are all included in the technical scope of the present invention.

Working Example 1

7.2 g of lanthanum acetate 1.5 hydrate (manufactured by NIKKI Corporation) and 31 g of zirconium oxyacetate (manufactured by DAIICHI KIGENSO KAGAKU KOGYO CO., LTD.) were added to a mixture of 1430 g of aluminum isopropoxide obtained by using high-purity metallic aluminum (manufactured by Sumitomo Chemical Company, Limited) with a purity of 99.99% or more and isopropyl alcohol (manufactured by JXTG Nippon Oil & Energy Corporation) with a purity of 99.9% or more, and 160 g of isopropyl alcohol, and the resulting mixture was stirred under reflux for 60 minutes. A first hydrolysis step was then carried out by adding a mixed liquid of isopropyl alcohol and water (isopropyl alcohol:water=9:1 in terms of a weight ratio) such that the molar ratio of water to the aluminum alkoxide was 1.7.

60% by weight of isopropyl alcohol based on the amount of the isopropyl alcohol added in first hydrolysis step S21 was then recovered. Thereafter, a suspension containing aluminum hydroxide, water and isopropyl alcohol was obtained by carrying out second hydrolysis step S22 by additionally adding water such that the molar ratio of water to the aluminum isopropoxide was 2.3 (the total molar ratio of water to the aluminum isopropoxide in step S21 and step S22 is 4.0). The obtained suspension was heated to be dried while being stirred to obtain aluminum hydroxide (pseudo-boehmite) powder. The obtained aluminum hydroxide powder was fired at 1000° C. for 4 hours by an electric furnace to obtain alumina material of Working Example 1 containing alumina (γ-alumina), La and Zr.

The amounts of added metal elements (Zr and La) were 1% by weight for Zr and 1% by weight for La, expressed in % by weight based on the total weight of the alumina material.

For the obtained alumina material, the BET specific surface area (BET-1) of the alumina material was determined by a $N_2$ absorption method in accordance with a method specified in JIS-Z-8830 by using a specific area measuring apparatus "FlowSorb II 2300" manufactured by Shimadzu Corporation. Next, the alumina material was subjected to heat treatment at 1100° C. under the air atmosphere for 4 hours, and the BET specific surface area (BET-2) was similarly measured by a $N_2$ absorption method. In addition, after the alumina material was subjected to heat treatment at 1200° C. under the air atmosphere for 4 hours, the BET specific surface area (BET-3) was similarly measured. Measured values are described in Table 1.

Working Examples 2 to 4

Except that the composition of zirconium (Zr) and lanthanum (La) was as shown in Table 1, the same treatment as in Example 1 was performed to prepare alumina material containing alumina, Zr and a rare earth element La if necessary. For the obtained alumina material, three BET specific surface areas (BET-1, BET-2 and BET-3) were measured in the same manner as in Example 1. Measured values are described in Table 1.

Comparative Example 1

In Comparative Example 1, synthesis was performed as follows by using the method in Example 1 in Patent Literature 3.

A 1.6 mol/L aqueous aluminum nitrate solution, a 1.46 mol/L aqueous zirconium oxynitrate solution and a 1.63 mol/L aqueous lanthanum nitrate solution were mixed to obtain a mixed solution. The mixed solution was then added, while being sufficiently stirred, to an aqueous solution obtained by mixing 356 mL of a 25% aqueous ammonia solution (pH≥9) and 500 mL of pure water, so that hydroxide precipitates as precursors of $Al_2O_3$, $ZrO_2$ and a rare earth oxide were coprecipitated and obtained. The obtained hydroxide precipitates were centrifugally separated, subsequently washed with water sufficiently, and then held in an air atmosphere at 400° C. for 5 hours to be dried by evaporation. Then, firing was performed in an air atmosphere at 700° C. for 5 hours to obtain alumina material. The amounts of added metal elements (Zr and La) were 3% by weight for Zr and 1% by weight for La, expressed in % by weight based on the total weight of the alumina material.

For the obtained alumina material, three BET specific surface areas (BET-1, BET-2 and BET-3) were measured in the same manner as in Example 1. Measured values are described in Table 1.

Comparative Examples 2 and 3

Except that the composition of zirconium (Zr) and lanthanum (La) was as shown in Table 1, the same treatment as in Comparative Example 1 was performed to prepare alumina material. For the obtained alumina material, three BET specific surface areas (BET-1, BET-2 and BET-3) were measured in the same manner as in Example 1. Measured values are described in Table 1.

TABLE 1

| | | Working Example | | | | Comparative Example | | |
|---|---|---|---|---|---|---|---|---|
| | | 1 | 2 | 3 | 4 | 1 | 2 | 3 |
| Composition | Zr (% by weight) | 1 | 3 | 3 | 5 | 3 | 10 | 16 |
| | La (% by weight) | 1 | — | 1 | — | 1 | — | 1 |

TABLE 1-continued

|  |  | Working Example | | | | Comparative Example | | |
|---|---|---|---|---|---|---|---|---|
|  |  | 1 | 2 | 3 | 4 | 1 | 2 | 3 |
| BET-1 | 1000° C. (m²/g) | 157 | 137 | 154 | 138 | 126 | 120 | 122 |
| BET-2 | 1100° C. (m²/g) | 119 | 104 | 110 | 113 | 60 | 53 | 54 |
| BET-3 | 1200° C. (m²/g) | 80 | 63 | 80 | 61 | 40 | 29 | 29 |
| $I_B/I_A$ | — | 0.1 | 0.1 | 0.1 | 0.2 | 1.1 | 1.0 | 1.0 |

According to Table 1 above, the value of BET-3 exceeded 50 m²/g in all Working Examples, and the alumina materials obtained in Working Examples were confirmed to have high heat resistance in which even when the alumina material was exposed to a high temperature, a high specific surface area was maintained, and the performance thereof was not markedly reduced.

Measurement and Analysis of Extended X-Ray Absorption Fine Structure (EXAFS) Spectrum Measurement of the EXAFS spectrum of the K absorption edge of zirconium in alumina material was performed by a QuickXAFS method by using a Beam Line NW-10A XAFS measuring apparatus at the Photon Factory of the Institute of Materials Structure Science of the High Energy Accelerator Research Organization. The incident X-ray intensity ($I_0$) was measured at ordinary temperature by using an ion chamber with Ar (25% by volume)+$N_2$ (75% by volume) used as a gas, and the transmitted X-ray intensity ($I_t$) was measured at ordinary temperature by using an ion chamber with Kr used as a gas. The range of energy measured, the interval and the integral time per measurement point were set as follows.

Range of energy of incident X-ray: 17494 to 19099 eV
Number of data points: 3835 points
Scanning time: 300 seconds
Integration: once From above, $I_0$ and $I_y$ were measured in each incident X-ray energy (E, x axis), the X-ray absorbance (y axis) was determined from the following expression, and the values were plotted on the x axis-y axis to obtain an X-ray absorption spectrum.

$$X\text{-ray absorbance } \mu t = -\ln(I_t/I_0)$$

The EXAFS spectrum was analyzed in the following manner.

From the X-ray absorption spectrum, the EXAFS spectrum of the K absorption edge of Zr was obtained in the following manner to obtain a radial distribution function. Specifically, the obtained X-ray absorption spectrum data by the QuickXAFS method was converted into a Rigaku EXAFS analysis software format with "Multi File Converter" and "Multi data Smoothing" provided by High Energy Accelerator Research Organization, and smoothing processing was performed (smoothing conditions: Savitzky-Golay method, points: 10, rep: 5), followed by analyzing EXAFS oscillation by using analysis software (REX 2000 manufactured by Rigaku Corporation). The energy $E_0$ (x axis) of the K absorption edge of Zr was set to an energy value (x axis) at which the first-order differential coefficient was the maximum in a spectrum in the vicinity of the K absorption edge of Zr in the X-ray absorption spectrum. The background for the spectrum was determined by applying a Victoreen expression ($A\lambda^3 - B\lambda^4 + C$; $\lambda$: wavelength of incident X-ray, A, B and C: arbitrary constants) to a spectrum in a region with energy lower than that of the K absorption edge of Zr by a least squares method, and the background was subtracted from the spectrum. Subsequently, for the spectrum, the absorbance ($\mu_0$) of an isolated atom was estimated by a spline smoothing method (set at spline termination 1: 0.002, spline termination: 0.2), and an EXAFS function $\chi(k)$ was extracted. k is a wavenumber of photoelectrons as defined by $0.5123 \times (E-E_0)^{1/2}$, and here, the unit of k is Å$^{-1}$. Finally, unless otherwise specified, the EXAFS function $k^3\chi(k)$ weighed with $k^3$ was Fourier-transformed at k of 3.0 to 12.0 Å$^{-1}$ to obtain a radial distribution function g(R) (Fourier-transformation conditions are as follows. Ft size: 2048, Filter type: HANNING, Window width: Δk/10). The interatomic distance on the abscissa in the obtained radial distribution function is uncorrected.

From the obtained radial distribution function, the maximum intensity $I_A$ among the intensities of peaks present at 0.1 nm to 0.2 nm and the maximum intensity $I_B$ among the intensities of peaks present at 0.28 nm to 0.35 nm were determined. The value of $I_B/I_A$ determined by this method was 0.1 in Working Examples 1 to 3, and 0.2 in Working Example 4. The value of $I_B/I_A$ determined by this method was 1.1 in Comparative Example 1, and 1.0 in Comparative Examples 2 and 3. In addition, the radial distribution function obtained for the alumina material obtained in Working Example 2 is shown as a curve X in FIG. 1. As a reference, a similar radial distribution function for only zirconia ($ZrO_2$) is shown as a curve Y in FIG. 1. The radial distribution function obtained for the alumina material of Working Example 1 is shown as a curve CA in FIG. 2, the radial distribution function for the alumina material of Working Example 3 is shown as a curve CB in FIG. 3, the radial distribution function for the alumina material of Working Example 4 is shown as a curve CC in FIG. 4, the radial distribution function for the alumina material of Comparative Example 1 is shown as a curve CD in FIG. 5, the radial distribution function for the alumina material of Comparative Example 2 is shown as a curve CE in FIG. 6, and the radial distribution function for the alumina material of Comparative Example 3 is shown as a curve CF in FIG. 7.

INDUSTRIAL APPLICABILITY

The alumina material of the present invention is excellent in heat resistance, the alumina material having a small reduction in BET specific surface area through heat treatment. The alumina material is used as a base material of a catalyst for treatment of exhaust gas from internal combustion engines of automobiles, two-wheeled vehicles and the like, and treatment of exhaust gas in gas turbines, boilers and the like.

The invention claimed is:

1. Alumina material comprising alumina and zirconium, wherein in a radial distribution function obtained by Fourier-transforming an extended X-ray absorption fine structure (EXAFS) spectrum of a K absorption edge of the zirconium in the alumina material, a value of $I_B/I_A$ is 0.5 or less where $I_A$ is a maximum intensity among intensities of peaks present at 0.1 nm to 0.2 nm, and $I_B$ is a maximum intensity among intensities of peaks present at 0.28 nm to 0.35 nm,
   wherein a clear peak is not observed at 0.28 nm to 0.35 nm in the radial distribution function, and
   wherein the clear peak is an upwardly projected peak having a ratio of an intensity of the peak to $I_A$ being 0.12 or less, and a half width of the peak being 0.06 nm or less.

2. The alumina material according to claim 1, wherein an amount of zirconium in the alumina material is 0.1% by weight to 15% by weight based on a total weight of the alumina material.

3. The alumina material according to claim 1, wherein the alumina material further comprises at least one of rare earth elements.

4. The alumina material according to claim 3, wherein the at least one of rare earth elements is selected from the group consisting of cerium, yttrium, lanthanum, praseodymium, neodymium, and ytterbium.

5. The alumina material according to claim 3, wherein the at least one of rare earth elements is cerium and/or lanthanum.

6. The alumina material according to claim 3, wherein the at least one of rare earth elements is lanthanum.

7. The alumina material according to claim 1, wherein a total amount of zirconium and the at least one of rare earth elements in the alumina material is 0.5% by weight to 15% by weight based on a total weight of the alumina material.

8. The alumina material according to claim 1, wherein a specific surface area after the alumina material is subjected to heat treatment under an air atmosphere at 1200° C. for 4 hours is 50 m$^2$/g or more.

9. The alumina material according to claim 1, wherein the alumina comprises at least 80 wt % of γ alumina.

* * * * *